US012101847B1

(12) United States Patent
Modi et al.

(10) Patent No.: US 12,101,847 B1
(45) Date of Patent: Sep. 24, 2024

(54) SYSTEM AND METHOD FOR CONTROLLING SIGNALING DURING X2/Xn TNLA DISCOVERY PROCESS

(71) Applicant: Rakuten Symphony, Inc., Tokyo (JP)

(72) Inventors: Rahul Modi, Bangalore (IN); Nirav Salot, Bangalore (IN); Sridhar Bhaskaran, Bangalore (IN); Masaya Maeda, Tokyo (JP)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/039,030

(22) PCT Filed: Apr. 6, 2023

(86) PCT No.: PCT/US2023/017696
  § 371 (c)(1),
  (2) Date: May 26, 2023

(51) Int. Cl.
  *H04W 8/00* (2009.01)
  *H04W 74/0833* (2024.01)
  *H04W 84/04* (2009.01)
  *H04W 92/20* (2009.01)

(52) U.S. Cl.
  CPC ......... *H04W 8/005* (2013.01); *H04W 74/085* (2013.01); *H04W 84/042* (2013.01); *H04W 92/20* (2013.01)

(58) Field of Classification Search
  CPC .. H04W 8/005; H04W 74/085; H04W 84/042
  USPC ........................................................ 370/329
  See application file for complete search history.

(56) References Cited

U.S. PATENT DOCUMENTS

| 2014/0321447 A1* | 10/2014 | Ozturk | H04W 60/00 370/338 |
| 2015/0215774 A1* | 7/2015 | Huang | H04W 8/26 455/422.1 |
| 2020/0196225 A1 | 6/2020 | Wang et al. | |
| 2023/0013712 A1 | 1/2023 | Maheshwari et al. | |
| 2023/0043184 A1 | 2/2023 | Rajput et al. | |

OTHER PUBLICATIONS

International Search Report with Written Opinion of the International Searching Authority issued by the United States Patent and Trademark Office for corresponding International Patent Application No. PCT/US23/17696, mailed on Aug. 15, 2023.

* cited by examiner

*Primary Examiner* — Chuck Huynh
(74) *Attorney, Agent, or Firm* — Myers Wolin, LLC

(57) ABSTRACT

A UE reports an ECGI of a target eNB/gNB missing an X2/Xn interface to a source eNB/gNB. The source eNB/gNB sends a configuration transfer message to a network element to get the X2/Xn interface TNLA of the target eNB/gNB. The source eNB/gNB initiates an initial backoff timer and an exponential backoff multiplier. The source eNB/gNB determines whether the TNLA discovery procedure time is equal to or greater than a current backoff time, the current backoff time being equal to a previous backoff period multiplied by the exponential backoff multiplier. The source eNB/gNB may resend the configuration transfer message to the network element when a previous TNLA discovery procedure time for the same ECGI is equal to or greater than the current backoff time, and not resend the configuration transfer message to the network element when the previous TNLA discovery procedure time is less than the current backoff time.

19 Claims, 6 Drawing Sheets

SYSTEM AND METHOD FOR CONTROLLING SIGNALING DURING X2/Xn TNLA DISCOVERY PROCESS

CROSS-REFERENCE TO RELATED APPLICATION

This application is a national stage application of International Application No. PCT/US2023/017696, filed on Apr. 6, 2023, and designated the U.S., the entire contents of which are herein wholly incorporated by reference.

TECHNICAL FIELD

The disclosure is related to signaling during an X2/Xn TNLA discovery. More particularly, the disclosure relates to avoiding a signaling storm towards a core network during a X2/Xn Transport Network Layer Association (TNLA) discovery procedure.

BACKGROUND

Generally, a wireless communication system includes a Radio Access Network (RAN) and a Core Network (CN). The RAN includes a number of base stations each providing coverage to serve a plurality of user equipment (UE) devices such as cell phones, tablet computers, laptop computers, embedded wireless modules, and other wirelessly equipped devices, whether or not user operated. The base stations may include a remote radio unit (RRU) and base band unit (BBU). The base stations or access points may be coupled with the CN via communication links commonly referred to as backhaul links. The CN in virtually all wireless communications systems provides connectivity with a fixed system such as the Public Switched Telephone Network (PSTN) and/or the Internet.

Wireless communications services are provided by specific operators in specific locations. These individual wireless networks are often referred to as a cellular network. The specific operator or cellular network may be referred to as a Public Land Mobile Network (PLMN). A PLMN is identified by a PLMN identity broadcast within a System Information Block (SIB) 1 (SIB1), and a UE is responsible for selecting a PLMN. A cell may belong to more than one PLMN, and in such a case, the SIB-1 may broadcast multiple PLMN identities.

Each cellular network may operate with a specific radio access protocol such as Long Term Evolution (LTE) and New Radio (NR) or 5G wireless communications protocols. LTE and 5G networks share an all Internet Protocol (IP) architecture. The network architecture of a LTE network and a 5G network vary in some respects. Many current LTE networks are being migrated to 5G networks. A Non-standalone (NSA) 5G architecture may include a 4G/LTE core implemented with 5G radios. A Standalone (SA) 5G network is an end-to-end 5G network. In an LTE network, a base station may be referred to as an eNB, eNBs may be interconnected via an X2 link, and the network may include a Mobility Management Entity (MME) to manage UE access and mobility. In a 5G network, a base station may be referred to as gNB, gNBs may be interconnected via an Xn link, and may include a Access and Mobility Management Function (AMF) for handling connection and mobility management tasks.

Generally, each base station may provide a coverage area and define an air interface for carrying communications between the base station and UEs, including a downlink from the base station to UEs and an uplink from UEs to the base station. The air interface could occupy a carrier, which could be frequency division duplex (FDD), having separate ranges of frequency respectively for downlink and uplink communication, or time division duplex (TDD), having a single range of frequency multiplexed over time between downlink and uplink use.

According to the radio access protocol, the air interface may then define various resources and channels for carrying communications between the base station and UEs, including various control-plane communications (e.g., operational control signaling) and user-plane communications (e.g., bearer data such as application-layer communications).

On the downlink, for instance, the air interface could define a reference channel that carries a broadcast reference signal that UEs can measure to evaluate downlink coverage quality, as well as various other downlink control channels for carrying control signaling to UEs, and the air interface may define one or more traffic channels for carrying bearer data and the like to UEs. On the uplink, the air interface could define an access channel for carrying UE access requests to the base station as well as various other uplink control channels for carrying control signaling to the base station, and the air interface could define one or more uplink traffic channels for carrying bearer data and the like to the base station.

A UE in a connected state will send and receive data packets through a wireless communication link with a source base station. The quality of the wireless signal between the UE and base stations in a network may change over time for various reasons including a change in the location of the UE as the UE travels through the coverage area, base station loading, and signal fading.

The source base station will monitor the quality of signal connection between the UE and source base station by sending a measurement control request message to the UE and receiving a measurement report message from the UE. Based on measurement report criteria and threshold settings, the source base station may make a decision to hand the UE over to a target base station. As part of the handover process the UE sends a measurement report identifying a target base station. In some cases the reported target base station may have a Physical Cell ID (PCI) that is unknown to the source base station. That is, the reported target base station is not in the source base stations Neighbor Relation Table (NRT).

In the case where the target base station (PCI) is not known by the source base station, the source base station will send a configuration transfer message to a MME or AMF of the core network to discover the X2/Xn Transport Network Layer Association (TNLA). If the MME/AMF is unable to reach the target base station, the MME/AMF will not send a response to the configuration transfer message and the source base station will not learn the X2/Xn TNLA address of the target base station.

The source base station will continue to send the configuration transfer message until it learns the X2/Xn TNLA address of the target base station. This results in an unnecessary signaling storm towards the core network.

Thus, the need exists for a solution that will prevent an unnecessary signaling storm towards the core network during a X2/Xn TNLA discovery procedure when a target base station is not known.

SUMMARY

In one general aspect, a method of reducing Transport Network Layer Association (TNLA) discovery procedure messages is provided. The method may include reporting by an User Equipment (UE) an Enhanced Cell Global Identifier (ECGI) of a target neighbor base station missing an X2 or Xn interface TNLA; receiving the ECGI of the target neighbor base station missing the X2 or Xn interface TNLA by a source base station; sending, by the source base station to a network element, a configuration transfer message to get the X2 or Xn interface TNLA of the target neighbor base station where a time between sending the configuration transfer message and waiting for the network element to send a network configuration transfer message in response to configuration transfer message may include a TNLA discovery procedure time. The method may include initiating an initial backoff timer and an exponential backoff multiplier; determining whether a time elapsed from a previous TNLA discovery procedure timestamp is equal to or greater than a current backoff time, the current backoff time being equal to a previous backoff period multiplied by the exponential backoff multiplier. The method may also include resending by the source base station the configuration transfer message to the network element in a case where the time elapsed from a previous TNLA discovery procedure time is equal to or greater than the current backoff time, and not sending the configuration transfer message to the network element in the case where the time elapsed from the previous TNLA discovery procedure time is less than the current backoff time; performing an X2 or Xn setup between the source base station and the target base station in the case where the network element configuration transfer message is received; and stopping the source base station from resending the configuration transfer message once a maximum backoff time is reached and the network element configuration transfer message is not received. Other embodiments of this aspect include corresponding computer systems, apparatus, and computer programs recorded on one or more computer storage devices, each configured to perform the actions of the methods.

Implementations may include one or more of the following features. The method where the network element sends the network configuration transfer message after the network element discovers identification information for the target neighbor base station. The method where the exponential backoff multiplier starts with an initially configured backoff period and subsequently increases the backoff period by a factor multiplied with a previous backoff period and where the exponential backoff multiplier is configured with a maximum backoff time. The method where the initial backoff timer, the exponential backoff multiplier and the maximum backoff time are configurable. The method may include determining whether the ECGI is from the same Public Land Mobile Network (PLMN) or a blocked PLMN, and initiating a configuration transfer procedure for an ECGI that is from the same PLMN or a nonblocked PLMN. The method where the source base station is a S-eNB, the target neighbor base station is a T-eNB, the network element is a Mobility Management Entity (MME), and the X2 interface is implemented. The method where the configuration transfer message is an eNB configuration transfer message, and the network element configuration transfer message is a MME configuration message. The method where the source base station is a S-gNB, the target neighbor base station is a T-gNB, the network element is an Access and Mobility Management Function (AMF), and the Xn interface is implemented. The method where the configuration transfer message is an uplink Radio Access Network (RAN) configuration transfer message, and the network element configuration transfer message is a downlink RAN configuration transfer message. Implementations of the described techniques may include hardware, a method or process, or a computer tangible medium.

In another general aspect, a wireless communication system is provided. The wireless communication system may include a target base station; a network element; a User Equipment (UE) configured to report an Enhanced Cell Global Identifier (ECGI) of a target base station missing an X2 or Xn interface Transport Network Layer Association (TNLA); and a source base station configured to: receive the ECGI of the target base station reported by the UE; send a configuration transfer message to the network element as a request for the X2 or Xn interface TNLA of the target base station; initiate an initial backoff timer and initiate an exponential backoff multiplier; determine whether a time elapsed from a previous TNLA discovery procedure timestamp is equal to or greater than a current backoff time where the current backoff time is equal to a previous backoff period multiplied by the exponential backoff multiplier, and where a TNLA discovery procedure time is a time between sending the configuration transfer message and receiving a network configuration transfer message from the network element; resend the configuration transfer message to the network element in a case where the time elapsed from a previous TNLA discovery procedure time is equal to or greater than the current backoff time, and not send the configuration transfer message to the network element in the case where the time elapsed from the previous TNLA discovery procedure time is less than the current backoff time; perform an X2 or Xn setup with the target base station in the case where the network element configuration transfer message is received, and stop resending the configuration transfer message once a maximum backoff time is reached and the network element configuration transfer message is not received. Other embodiments of this aspect include corresponding computer systems, apparatus, and computer programs recorded on one or more computer storage devices, each configured to perform the actions of the methods.

Implementations may include one or more of the following features. The wireless communication system where the network element sends the network configuration transfer message after the network element discovers identification information for the target base station. The wireless communication system where the exponential backoff multiplier starts with an initially configured backoff period and subsequently increases the backoff period by a factor multiplied with a previous backoff period. The wireless communication system where the initial backoff timer, the exponential backoff multiplier and the maximum backoff time are configurable. The wireless communication system where the source base station is further configured to determine whether the ECGI is from the same Public Land Mobile Network (PLMN) or a blocked PLMN, and initiate a configuration transfer procedure only for an ECGI that is from the same PLMN or a nonblocked PLMN. The wireless communication system where the source base station is a S-eNB, the target base station is a T-eNB, the network element is a Mobility Management Entity (MME), and the X2 interface is implemented. The wireless communication system where the configuration transfer message is an eNB configuration transfer message, and the network element configuration transfer message is a MME configuration message. The wireless communication system where the source base station is a S-gNB, the target base station is a T-gNB, the network element is an Access and Mobility Management Function (AMF), and the Xn interface is implemented. The wireless communication system where the configuration transfer message is an uplink Radio Access Network (RAN) configuration transfer message, and the network element configuration transfer message is a downlink RAN configuration transfer message. Implementations of the described techniques may include hardware, a method or process, or a computer tangible medium.

In yet another general aspect, a non-transitory computer-readable medium having stored thereon instructions for causing processing circuitry to execute a process is provided. The a non-transitory computer-readable medium having stored thereon instructions for causing processing circuitry to execute a process, the process comprising: reporting by an User Equipment (UE) an Enhanced Cell Global Identifier (ECGI) of a target neighbor base station missing an X2 or Xn interface TNLA; receiving the ECGI of the target neighbor base station missing the X2 or Xn interface TNLA by a source base station; sending, by the source base station to a network element, a configuration transfer message to get the X2 or Xn interface TNLA of the target neighbor base station where a time between sending the configuration transfer message and waiting for the network element to send a network configuration transfer message in response to configuration transfer message may include a TNLA discovery procedure time; initiating an initial backoff timer and initiating an exponential backoff multiplier; determining whether a TNLA discovery procedure timestamp is equal to or greater than a current backoff time, the current backoff time being equal to a previous backoff period multiplied by the exponential backoff multiplier; resending by the source base station the configuration transfer message to the network element in a case where the time elapsed from a previous TNLA discovery procedure time is equal to or greater than the current backoff time, and not sending the configuration transfer message to the network element in the case where the time elapsed from the previous TNLA discovery procedure time is less than the current backoff time; performing an X2 or Xn setup between the source base station and the target base station in the case where the network element configuration transfer message is received, and stopping the source base station from resending the configuration transfer message once a maximum backoff time is reached and the network element configuration transfer message is not received. Other embodiments of this aspect include corresponding computer systems, apparatus, and computer programs recorded on one or more computer storage devices, each configured to perform the actions of the methods.

DETAILED DESCRIPTION

Figure 1:
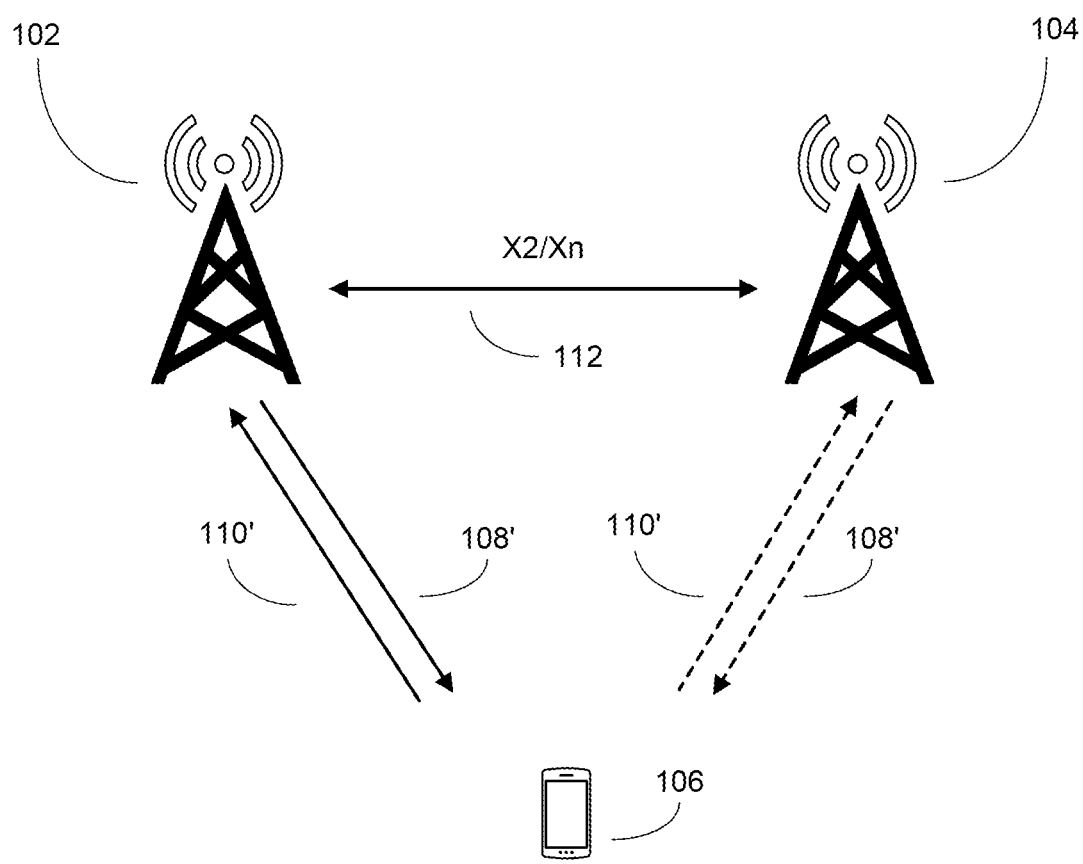
FIG. 1 illustrates a communication link between a mobile device and a base station according to an example embodiment.

FIG. 1 illustrates a communication link between a mobile device and a source base station pre-handover and a communication link between a mobile device and a target base station post-handover. The base station may be an eNB or a gNB. As shown in FIG. 1, source base station 102, has a bidirectional wireless connection with UE 106. Signal 108' may be referred to as a downlink (DL) signal and signal 110' may be referred to as an uplink (UL) signal. Mobile device 106 receives signal 108' from source base station 102 and transmits signal to 110' to source base station 102.

When source base station 102 determines that UE 104 should be handed over to target base station 104, source base station 102 will attempt to establish an X2/Xn connection with target base station 104. An X2/Xn handover procedure is performed without involving the packet core network. That is, corresponding messages are exchanged between the source base station and the target base station. When the target base station is known to the source base station a direct X2/Xn transport link 112 is established between the source base station and the target base station.

Once the handover process is complete, downlink 108' and uplink 110' signals are established between UE 106 and target base station 110', and downlink 108' and uplink 110' resources a released from source base station 102.

Figure 2A:
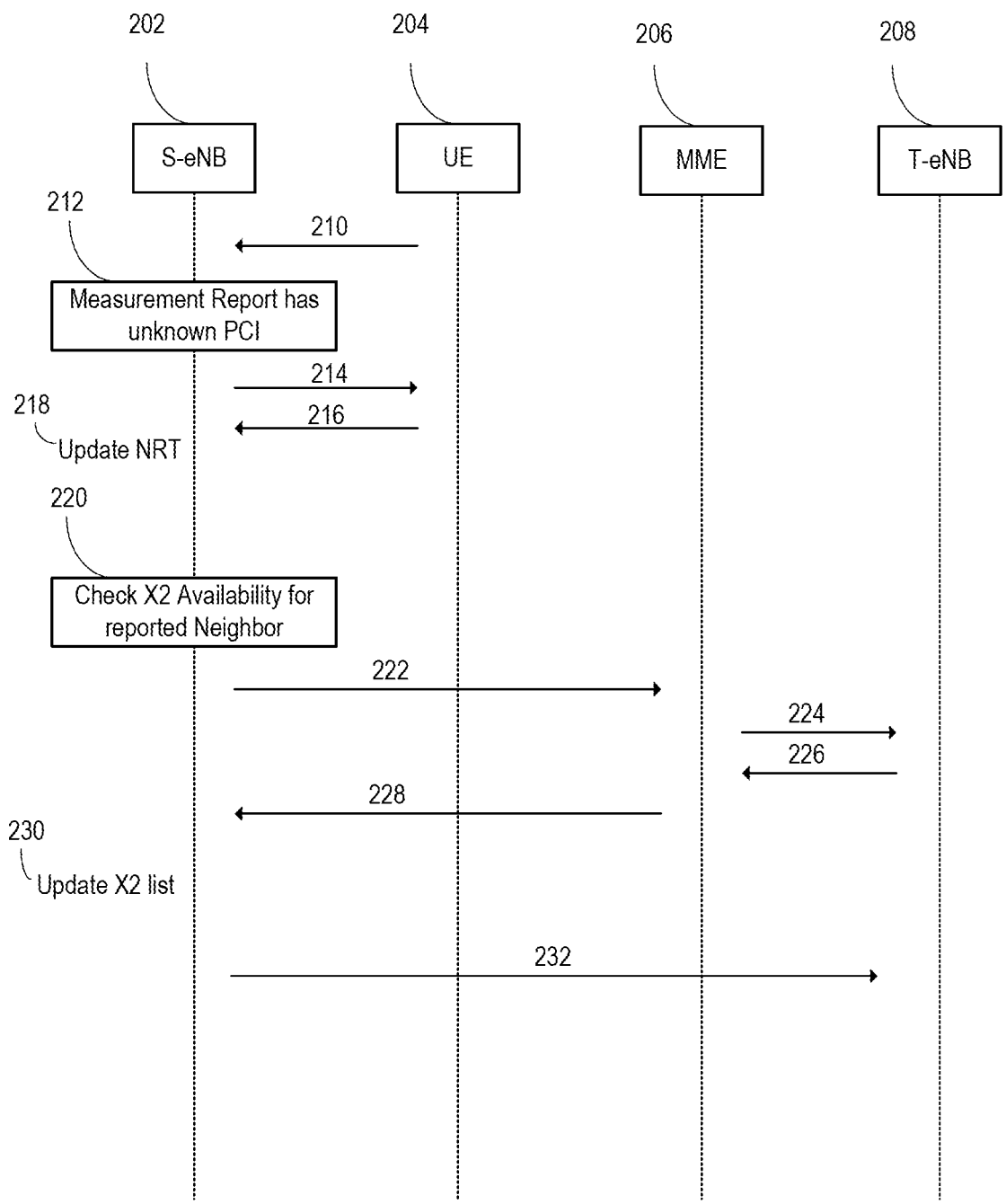
FIG. 2A illustrates a signaling diagram of a X2 TNLA discovery process in handover.

FIG. 2A illustrates a condensed handover signal diagram evoking an X2 TNLA discovery process. UE 204 sends a measurement report 210 to S-eNB 202. The measurement report 210 includes the signal strength of the S-eNB 202, the signal strength of the radio signal of the T-eNB 208, and the Physical Cell Identifier (PCI) of the T-eNB 208. Illustrated at 212, is the case where the PCI of the T-eNB 208 is unknown to the S-eNB 202. S-eNB 202 sends an Enhanced Cell Global Identifier (ECGI) request message 214 to a UE 204, and UE 204 responds by sending a measurement report with the ECGI information 216 of the T-eNB 208. At 218 the S-eNB 202 updates its Neighbor Relation Table (NRT). Although not shown, the S-eNB may transmit a new neighbor discovery notification to a network element and receive a configuration update for the new neighbor base station (T-eNB 208) so S-eNB can update the NRT at 218.

At 220, S-eNB 202 checks the X2 availability for the reported neighbor (T-eNB 208). For every ECGI that the S-eNB 204 does not have an X2 Transport Network Layer Association (TNLA) connectivity with, the S-eNB sends a eNB configuration transfer message 222 to a Mobility Management Entity (MME) 206 to get the TNLA of the new neighbor (T-eNB 208). MME 206 then sends a MME configuration transfer message 224 to T-eNB 208 to get the TNLA. In the case when MME 206 is successful in getting the TNLA of T-eNB 208, the T-eNB 208 responds by sending the TNLA details 226 to MME 206. MME 206 then sends the TNLA information 228 to S-eNB 202. At 230 S-eNB 202 updates its X2 list. S-eNB 202 then sends X2 setup request/eNB configuration update message 232 to T-eNB 208 to initiate the handover process.

Figure 2B:
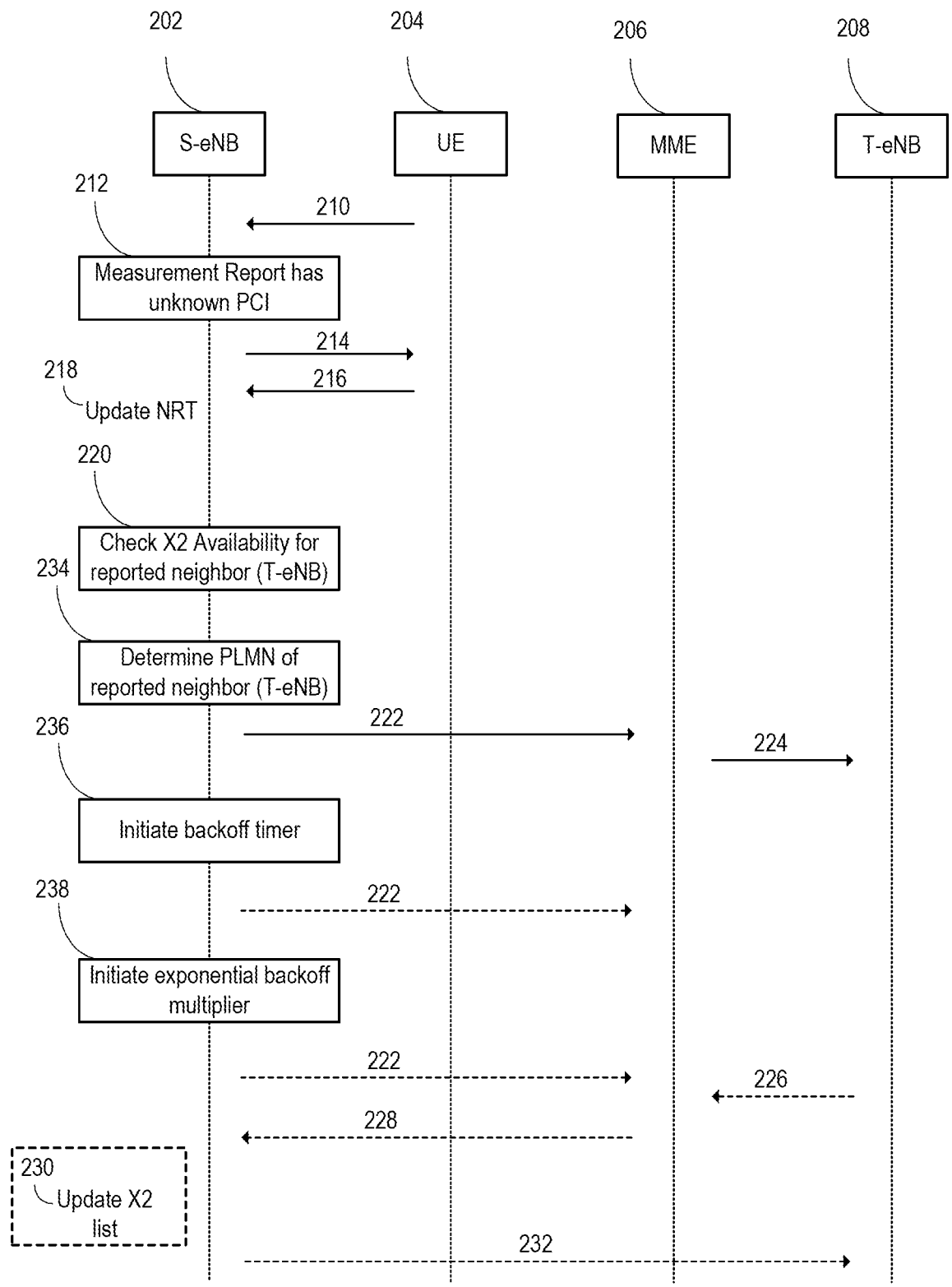
FIG. 2B illustrates a signaling diagram of a X2 TNLA discovery process according to some embodiments.

FIG. 2B illustrates a handover signal diagram evoking an X2 TNLA discovery process according to an example embodiment. 3GPP TS 36.423, incorporated by reference herein, describes the X2 application protocol and related signaling. The RAN of wireless communication systems may be dynamically reconfigured due to system requirements. Thus, base stations, access points, and the like may be added to the network and/or moved within the wireless coverage area of the network to accommodate network requirements. Consequently, situations arise where the network may not be able to identify a new neighbor or target base station.

In FIG. 2B the signaling and process from 210 to 220 is the same as described in FIG. 2A. At 234 the S-eNB determines the PLMN of the reported neighbor T-eNB 208. If the T-eNB 208 belongs to a PLMN that is different from the PLMN/operator of the S-eNB or is otherwise not available to the PLMN network of the S-eNB, the PLMN is blacklisted. An X2 establishment procedure will not be attempted for a neighbor/target with a blacklisted PLMN. In the case of a blacklisted PLMN, the neighbor/target should be added to the NRT and handover performed via S1 only.

For all non-blacklisted PLMNs, the S-eNB sends a eNB configuration transfer message 222 to a Mobility Management Entity (MME) 206 to get the TNLA of the new neighbor (T-eNB 208). As illustrated in FIG. 2A, in the case when MME 206 is successful in getting the TNLA of T-eNB 208, the T-eNB 208 responds by sending the TNLA details 226 to MME 206, and MME 206 then sends a MME configuration transfer message 224 to T-eNB 208 to get the TNLA. However, as described above, T-eNB 208 may be unknown or otherwise not reachable, and MME 206 does not receive a timely response from T-eNB 208. That is, MME 206 does not receive TNLA details 226. Thus, MME 206 cannot send the TNLA information 228 to S-eNB 202 because the MME 206 has not received the TNLA details 226 from T-eNB 206.

In the case where S-eNB fails to receive TNLA information 228 from MME 206, S-eNB 202 will continue to send eNB configuration transfer message 222 to MME 206 to discover the X2 TNLA of T-eNB 208. As a result an X2 signaling storm may be created as S-eNB 202 continues to send eNB configuration transfer message 222 to MME 206 to learn the X2 TNLA of T-eNB 208 while T-eNB is not known or is not reachable.

To avoid the X2 signaling storm and reduce the number of X2 messages in the X2 TNLA discovery process, an initial backoff timer may be initiated at 236. The initial backoff timer 236 is applied to the eNB configuration transfer message 222 when the pervious the eNB configuration transfer message 222 for the same ECGI is not resolved. That is, there is no response (226) from MME 206. Initial backoff timer 236 is configurable. Initial backoff timer 236 may be configured with an initial value of 5 to 600 seconds or more in steps of 5 for an example. Thus, when S-eNB 202 sends eNB configuration transfer message 222 and fails to receive a response, the S-eNB will not resend the eNB configuration transfer message 222 before expiration of the configured value for the initial backoff timer 236. S-eNB 202, however, will continue resending configuration transfer message 222 until receiving a response from MME 206. For example, if the initial backoff timer is set at 30 seconds, S-eNB 202 will continue resending configuration transfer message 222 every 30 seconds until a response is received from MME 206.

In addition, exponential backoff multiplier 238 may be implemented. The exponential backoff multiplier is a factor multiplied with a pervious backoff period successively causing an exponential backoff period. Exponential backoff multiplier 238 may be configurable. For example, exponential backoff multiplier 238 may be configured with a value of 4. Taking the foregoing example with an initial backoff timer configured with a value of 30 seconds, after an initial backoff of 30 seconds, the next backoff period would be 120 seconds (30×4). If no response from MME 206 S-eNB 202 will resend the eNB configuration transfer message 222 after 120 seconds. If a response from MME 206 is not received for the same ECGI, S-eNB 202 will then resend the eNB configuration transfer message 222 after 480 seconds (120× 4). If no response is received, the next eNB configuration transfer message 222 for the same ECGI will be sent after 1,920 seconds and so on. Thus, implementing the initial backoff timer 236 and the exponential backoff timer 238 greatly reduces the signaling overhead in the X2 TNLA discovery process. The exponential backoff timer 238 may be configured with a maximum back off value. This is a configurable value. The value may be set from 60 second to 3600 seconds or greater.

When a wireless communication network is dynamically changed, a new eNB and/or a T-eNB may be unknown to network elements. By implementing the techniques described in FIG. 2B, the X2 signaling overhead may be reduced significantly for any a new eNB or T-eNB that is unknown. Once a new eNB or T-eNB 208 responds to MME configuration transfer message 224 with its TNLA details in 226, MME 206 will respond to S-eNB 202 with the TNLA information 228. At 230 S-eNB 202 updates its X2 list. S-eNB 202 then sends X2 setup request/eNB configuration update message 232 to T-eNB 208 to initiate the handover process.

Figure 3:
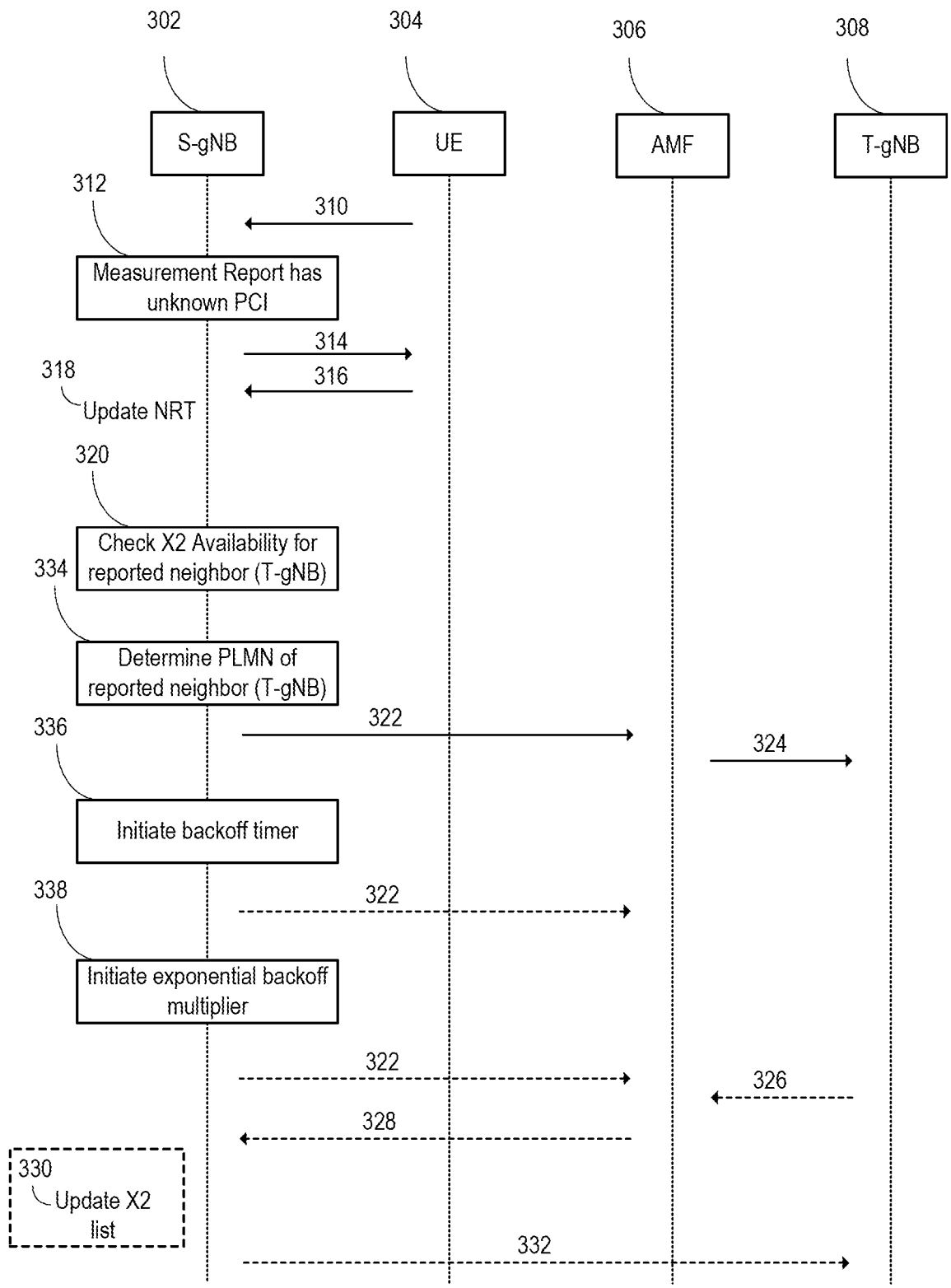
FIG. 3 illustrates a signaling diagram of a Xn TNLA discovery process according to some embodiments.

FIG. 3 illustrates a Xn TNLA discovery process according to an example embodiment. The Xn TNLA discovery process is similar to the X2 TNLA discovery process. The Xn TNLA discovery process, however, may be applicable to a 5G network while an X2 TNLA discovery process may be applicable to an LTE network.

In FIG. 3 the signaling and process from 310 to 320 is the same as described in FIG. 2B. UE 304 sends a measurement report 310 to S-gNB 302. The measurement report 310 includes the signal strength of the S-gNB 302, the signal strength of the radio signal of the T-gNB 308, and the Physical Cell Identifier (PCI) of the T-gNB 308. Illustrated at 312, is the case where the PCI of the T-gNB 308 is unknown to the S-gNB 302. S-gNB 302 sends an Enhanced Cell Global Identifier (ECGI) request message 314 to a UE 304, and UE 304 responds by sending a measurement report with the ECGI information 316 of the T-gNB 308. At 318 the S-gNB 202 updates its Neighbor Relation Table (NRT). Although not shown, the S-gNB 304 may transmit a new neighbor discovery notification to a network element and receive a configuration update for the new neighbor base station (T-gNB g08) so S-gNB can update the NRT at 318. At 320, S-gNB 302 checks the Xn availability for the reported neighbor (T-gNB 308). For every ECGI that the S-gNB 304 does not have an Xn Transport Network Layer Association (TNLA) connectivity with, S-gNB 304 sends a uplink RAN configuration transfer message 322 to an Access and Mobility Function (AMF) 306 to get the TNLA of the new neighbor (T-gNB 308).

AMF 306 then sends a downlink RAN configuration transfer message 324 to T-gNB 308 to get the TNLA. In the case where AMF 306 is successful in getting the TNLA of T-gNB 308, the T-gNB 208 responds by sending the TNLA details 326 to AMF 306. AMF 306 then sends the TNLA information 322 to S-gNB 302. At 330 S-gNB 302 updates its Xn list. S-gNB 302 then sends Xn setup request/gNB configuration update message 332 to T-gNB 308 to initiate the handover process.

At 334 S-gNB 304 determines the PLMN of the reported neighbor T-gNB 308. If the T-gNB 308 belongs to a PLMN that is different from the PLMN/operator of the S-gNB 304 or is otherwise not available to the PLMN network of the S-gNB 304, the PLMN is blacklisted. An Xn establishment procedure will not be attempted for a neighbor/target gNB with a blacklisted PLMN. In the case of a blacklisted PLMN, the neighbor/target gNB should be added to the NRT and handover performed via S1 only.

For all non-blacklisted PLMNs, the S-gNB 304 sends uplink RAN configuration transfer message 322 to a AMF 306 to get the TNLA of the new neighbor (T-gNB 308). As described above, in the case when AMF 306 is successful in getting the TNLA of T-gNB 308, T-gNB 308 responds by sending the TNLA details 326 to AMF 306, and AMF 306 then sends downlink configuration transfer message 322 to T-gNB 308 to get the TNLA.

However, T-gNB 308 may be unknown or otherwise not reachable, and AMF 306 does not receive a timely response from T-gNB 308. That is, AMF 306 does not receive TNLA details 326. Thus, AMF 306 cannot send the TNLA information 328 to S-gNB 302 because the AMF 306 has not received the TNLA details 326 from T-gNB 306.

In the case where S-gNB 302 fails to receive TNLA information 328 from AMF 306, S-gNB 302 will continue to send uplink RAN configuration transfer message 322 to AMF 306. As a result an Xn signaling storm may be created as S-gNB 302 continues to send uplink RAN configuration transfer message 322 to AMF 306 to learn the Xn TNLA of T-gNB 308 while T-gNB 308 is not known or is not reachable.

To avoid the Xn signaling storm and reduce the number of Xn messages in the Xn TNLA discovery process, an initial backoff timer may be initiated at 336. The initial backoff timer 336 is applied to the uplink RAN configuration transfer message 322 when the pervious uplink RAN configuration transfer message 322 for the same ECGI is not resolved. That is, there is no response (326) from AMF 3-6. Initial backoff timer 336 is configurable. Initial backoff timer 336 may be configured with an initial value of 5 to 600 seconds or more in steps of 5, for example. Thus, when S-gNB 302 sends uplink RAN configuration transfer message 322 and fails to receive a response, S-gNB 302 will not resend the uplink RAN configuration transfer message 322 before expiration of the configured value for the initial backoff timer 336. S-gNB 302, however, will continue resending uplink RAN configuration transfer message 322 until receiving a response from AMF 306. For example, if the initial backoff timer is set at 30 seconds, S-gNB 302 will continue resending uplink RAN configuration transfer message 322 every 30 seconds until a response is received from AMF 306.

In addition, exponential backoff multiplier 338 may be implemented. The exponential backoff multiplier is a factor multiplied with a pervious backoff period successively causing an exponential backoff period. Exponential backoff multiplier 338 may be configurable. For example, exponential backoff multiplier 338 may be configured with a value of 4. Taking the foregoing example with an initial backoff timer with a value of 30 seconds, after an initial backoff of 30 seconds, the next backoff period would be 120 seconds (30×4). If no response from AMF 306 is received S-gNB 302 will resend the uplink RAN configuration transfer message 322 after 120 seconds. If a response from AMF 306 is not received for the same ECGI, S-gNB 302 will then resend the uplink RAN configuration transfer message 322 after 480 seconds (120×4). If no response is received, the next uplink RAN configuration transfer message 322 for the same ECGI will be sent after 1,920 seconds and so on. Thus, implementing the initial backoff timer 336 and exponential backoff timer 338 greatly reduces the signaling overhead in the Xn TNLA discovery process. The exponential backoff timer 338 may be configured with a maximum back off value. This is a configurable value. The value may be set from 60 second to 3600 seconds or greater.

When a wireless communication network is dynamically changed, a new gNB and/or a T-gNB may be unknown to network elements. By implementing the techniques described in FIG. 3, the Xn signaling overhead may be reduced significantly for any a new gNB or T-gNB that is unknown. Once a new gNB or T-gNB 308 responds to downlink RAN configuration message with its TNLA details in 326, AMF 306 will respond to S-gNB 302 with the TNLA information 328. At 330 S-gNB 302 updates its Xn list. S-gNB 302 then sends Xn setup request/gNB configuration update message 332 to T-eNB 208 to initiate the handover process.

Figure 4:
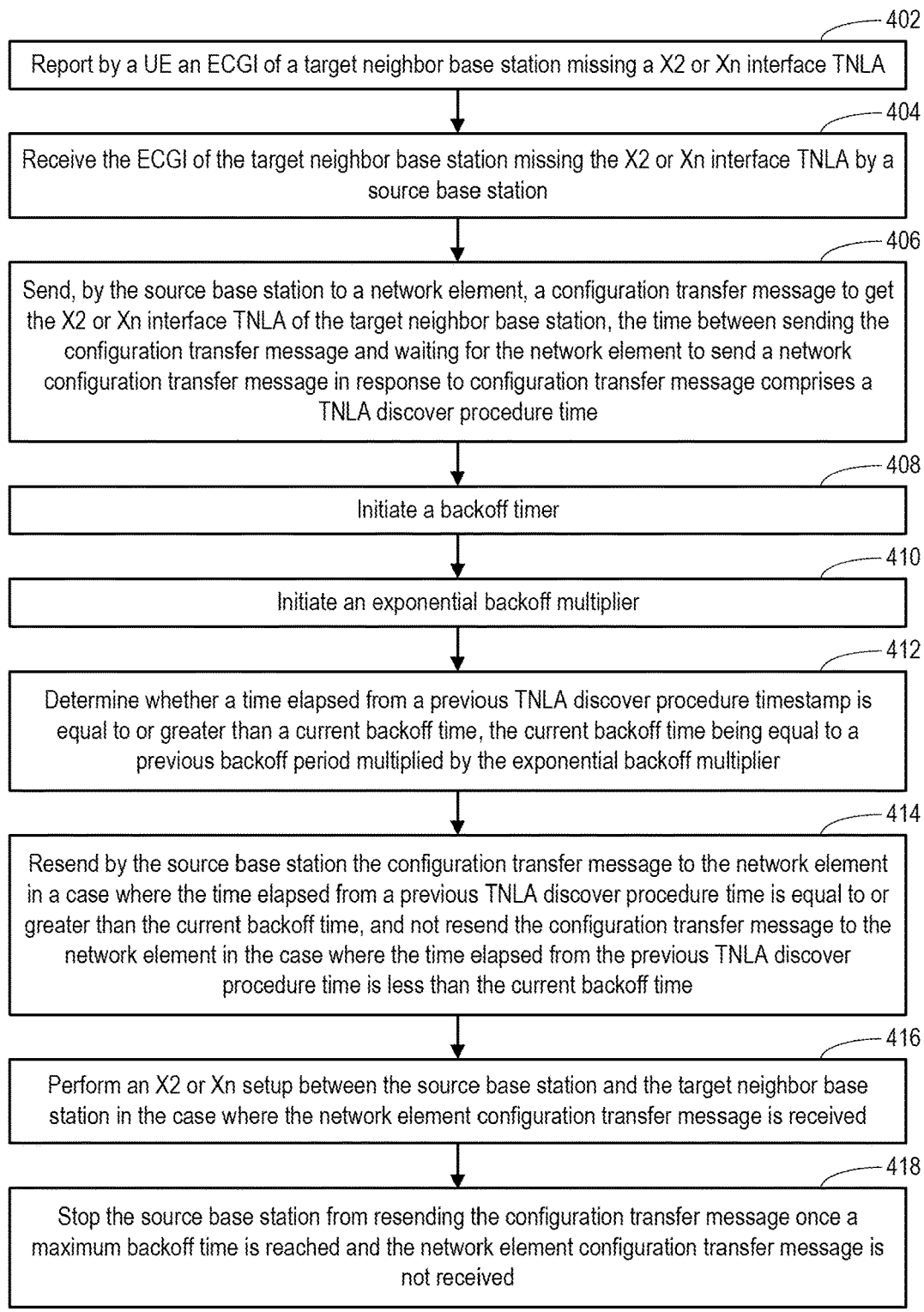
FIG. 4 is a flowchart of an example process for controlling a X2/Xn TNLA discovery process according to some embodiments.

FIG. 4 is a flowchart of an example process for controlling a X2 or Xn TNLA discovery process. As shown in FIG. 4, process 400 may include, at block 402, reporting by an User Equipment (UE) an Enhanced Cell Global Identifier (ECGI) of a target neighbor base station missing an X2/Xn interface TNLA. For example, a UE may report an Enhanced cell global identifier (ECGI) of a target neighbor base station missing an X2/Xn interface TNLA, to a source base station as described above. As shown at block 404, process 400 may include receiving the ECGI of the target neighbor base station missing the X2/Xn interface TNLA by a source base station. For example, the source base station may receive the ECGI of the target neighbor base station missing the X2/Xn TNLA, as described above. As further shown in FIG. 4 at block 406, process 400 may include sending, by the source base station to a network element, a configuration transfer message to get the X2/Xn TNLA of the target neighbor base station where a time between sending the configuration transfer message and waiting for the network element to send a network configuration transfer message in response to configuration transfer message comprises a TNLA discovery procedure time. For example, a TNLA discovery procedure may be initiated by the source base station sending the configuration transfer message to a network element to discover the X2/Xn TNLA of the target neighbor base station and the time between sending the configuration transfer message and waiting for the network element to send a network configuration transfer message in response may be referred to as a TNLA discovery procedure time. As also shown in FIG. 4 at 408, process 400 may include initiating an initial backoff timer and may include initiating an exponential backoff multiplier at 410. For example, the source base station may initiate the initial backoff timer after sending the configuration transfer message. While waiting for a response, the source base station will not resend the configuration transfer message until expiration of the initial backoff timer. The source base station will also implement the exponential backoff multiplier.

As further shown in FIG. 4 at 412, process 400 may include determining whether a time elapsed from a previous TNLA discovery procedure timestamp is equal to or greater than a current backoff time, the current backoff time being equal to a previous backoff period multiplied by the exponential backoff multiplier. For example, the source base station may determine whether the TNLA discovery procedure time is equal to or greater than a current backoff time where the current backoff time is equal to a previous backoff period multiplied by the exponential backoff.

As shown in FIG. 4 at 414, process 400 may include resending by the source base station the configuration transfer message to the network element in a case where the time elapsed from a previous TNLA discovery procedure time is equal to or greater than the current backoff time, and not resending the configuration transfer message to the network element in the case where the time elapsed from the previous TNLA discovery procedure time is less than the current backoff time. That is, the source base station may resend the configuration transfer message to the network element in a case where the time elapsed from a previous TNLA discovery procedure time is equal to or greater than the current backoff time. By implementing the exponential backoff multiplier, the current backoff time increases exponentially.

As described with reference to FIG. 2B, the initial backoff timer is applied to the configuration transfer message when the pervious configuration transfer message for the same ECGI is not resolved. That is, there is no response from the network element. Initial backoff timer 236 is configurable. Thus, when the source base station sends the configuration transfer message to the network element and fails to receive a response from the network element, the source base station will not resend the configuration transfer message before expiration of the value for the initial backoff timer. The source base station, however, will continue resending the configuration transfer message until receiving a response from the network element. For example, if the initial backoff timer is set at 30 seconds, the source base station will continue resending the configuration transfer message every 30 seconds until a response is received from the network element.

The exponential backoff multiplier may be implemented to reduce the X2/Xn signaling toward the network where the target base station is unknown or otherwise unreachable. The exponential backoff multiplier is a factor multiplied with a previous backoff period successively causing an exponential backoff period. For example. Taking the example with an initial backoff timer with a value of 30 seconds and the exponential backoff multiplier configured with a value of 4, after an initial backoff of 30 seconds, the next backoff period would be 120 seconds (4×30). If there is no response from the network element, the source base station will resend the configuration transfer message after 120 seconds. If a response from the network element is not received for the same ECGI, the source base station will then resend the configuration transfer message after 480 seconds (120×4). If no response is received, the next configuration transfer message for the same ECGI will be sent after 1,920 seconds (480×4) and so on. Thus, implementing the initial backoff timer and the exponential backoff timer will greatly reduce the signaling overhead in the X2/Xn TNLA discovery process. The exponential backoff timer may also be configured with a maximum back off value. This is a configurable value. The value may be set from 60 second to 3600 seconds or greater.

As further shown in FIG. 4 at 416, process 400 may include performing an X2 or Xn setup between the source base station and the target base station in the case where the network element configuration transfer message is received. For example, the source base station may perform the X2/Xn setup with the target base station upon receiving the network element configuration transfer message to establish the X2/Xn connection with the target base station. That is, when the network eventually receives a response from the target base station, whether after 30 seconds, 60 seconds, one hour or however long it takes, and sends the TNLA information of the target base station to the source base station, the source base station may perform the X2/Xn setup and establish the X2/Xn connection with the target base station.

As also shown in FIG. 4 at 418, process 400 may include stopping the source base station from resending the configuration transfer message once a maximum backoff time is reached and the network element configuration transfer message is not received. Namely, the source base will continue to resend the configuration transfer message until the maximum backoff time is reached. Once the maximum backoff time is reached the source base station will cease sending the configuration transfer message.

Process 400 may include additional implementations, such as any single implementation or any combination of implementations described below and/or in connection with one or more other processes described elsewhere herein. In a first implementation, the network element sends the network configuration transfer message after the network element discovers identification information for the target neighbor base station.

Figure 5:
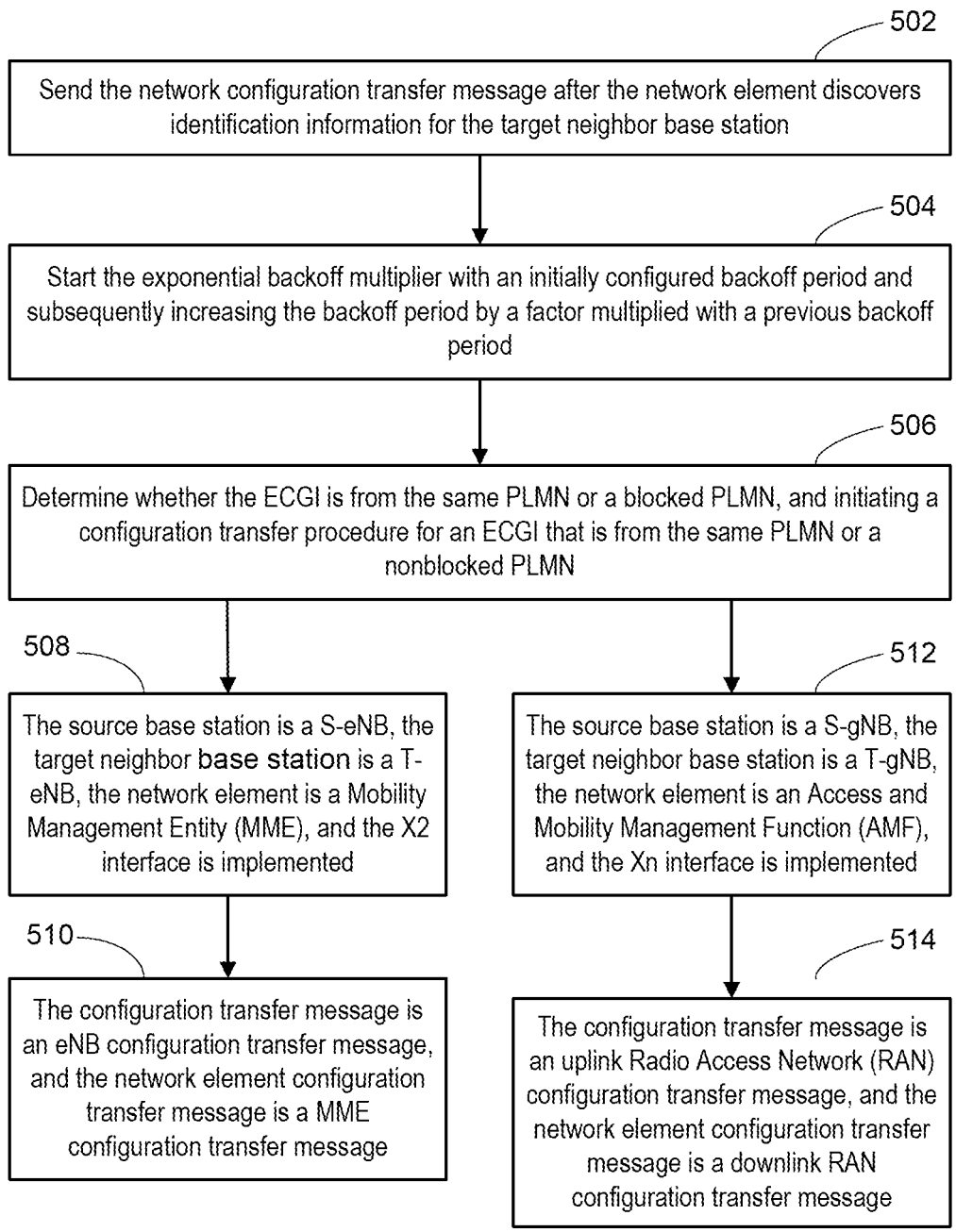
FIG. 5 is a flowchart of additional implementations for controlling a X2/Xn TNLA discovery process.

FIG. 5 is a flowchart of additional implementations for controlling a X2/Xn TNLA discovery process. In some implementations, one or more process blocks of FIG. 5 may be performed by a single device.

In a first implementation, at 502 the network element may only send the network configuration transfer message after the network element discovers identification information for the target neighbor base station.

In a second implementation, alone or in combination with the first implementation, at 504 the exponential backoff multiplier starts with an initially configured backoff period and subsequently increases the backoff period by a factor multiplied with a previous backoff period. The exponential backoff multiplier may be configured with a maximum backoff time.

In a third implementation, alone or in combination with the first and second implementation, at 506 process 500 may include determining whether the ECGI is from the same Public Land Mobile Network (PLMN) or a blocked PLMN, and may only initiate a configuration transfer procedure for an ECGI that is from the same PLMN or a nonblocked PLMN.

In a fourth implementation, alone or in combination with one or more of the first through third implementations, at 508 the source base station is a S-eNB, the target neighbor base station is a T-eNB, the network element is a Mobility Management Entity (MME), and the X2 interface is implemented.

In a fifth implementation, alone or in combination with one or more of the first through fourth implementations, at 510 the configuration transfer message is an eNB configuration transfer message, and the network element configuration transfer message is a MME configuration transfer message.

In a sixth implementation, alone or in combination with one or more of the first through third implementations, at 512 the source base station is a S-gNB, the target neighbor base station is a T-gNB, the network element is an Access and Mobility Management Function (AMF), and the Xn interface is implemented.

In an seventh implementation, alone or in combination with one or more of the first through third and sixth implementation, at 514 the configuration transfer message is an uplink Radio Access Network (RAN) configuration transfer message, and the network element configuration transfer message is a downlink RAN configuration transfer message.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Other variations to the disclosed embodiments can be understood and effected by those skilled in the art in practicing the recited features, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to an advantage.

Operations like acquiring, accessing, analyzing, capturing, comparing, determining, inputting, obtaining, outputting, providing, store or storing, calculating, simulating, receiving, warning, and stopping can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

What is claimed is:

1. A method of optimizing Transport Network Layer Association (TNLA) discovery procedure messages, the method comprising:
    reporting by a User Equipment (UE) an Enhanced Cell Global Identifier (ECGI) of a target neighbor base station that is missing an X2 or Xn interface TNLA in a source base station;
    receiving the ECGI of the target neighbor base station missing the X2 or Xn interface TNLA by a source base station;
    initiating a TNLA discovery procedure by sending, by the source base station to a network element, a configuration transfer message to get the X2 or Xn interface TNLA of the target neighbor base station wherein a time between sending the configuration transfer message and waiting for the network element to send a network configuration transfer message in response to configuration transfer message comprises a TNLA discovery procedure time;
    initiating an initial backoff timer;
    initiating an exponential backoff multiplier;
    determining whether a time elapsed from a previous TNLA discovery procedure timestamp is equal to or greater than a current backoff time, the current backoff time being equal to a previous backoff period multiplied by the exponential backoff multiplier;
    resending by the source base station the configuration transfer message to the network element in a case where the time elapsed from a previous TNLA discovery procedure time is equal to or greater than the current backoff time, and not sending the configuration transfer message to the network element in the case where the time elapsed from the previous TNLA discovery procedure time is less than the current backoff time;
    performing an X2 or Xn setup between the source base station and the target neighbor base station in the case where the network element configuration transfer message is received; and
    stopping the source base station from resending the configuration transfer message once a maximum backoff time is reached and the network element configuration transfer message is not received.

2. The method according to claim 1, wherein the network element sends the network configuration transfer message after the network element discovers identification information for the target neighbor base station.

3. The method according to claim 1, wherein the exponential backoff multiplier starts with an initially configured backoff period and subsequently increases the initially configured backoff period by a factor multiplied with the previous backoff period, and wherein the exponential backoff multiplier is configured with a maximum backoff time.

4. The method according to claim 3, wherein the initial backoff timer, the exponential backoff multiplier and the maximum backoff time are configurable.

5. The method according to claim 1, further comprising determining whether the ECGI is from the same Public Land Mobile Network (PLMN) or a blocked PLMN, and initiating a configuration transfer procedure for an ECGI that is from the same PLMN or a nonblocked PLMN.

6. The method according to claim 5, wherein the source base station is a S-eNB, the target neighbor base station is a T-eNB, the network element is a Mobility Management Entity (MME), and the X2 interface is implemented.

7. The method according to claim 6, wherein the configuration transfer message is an eNB configuration transfer message, and the network element configuration transfer message is a MME configuration transfer message.

8. The method according to claim 5, wherein the source base station is a S-gNB, the target neighbor base station is a T-gNB, the network element is an Access and Mobility Management Function (AMF), and the Xn interface is implemented.

9. The method according to claim 8, wherein the configuration transfer message is an uplink Radio Access Network (RAN) configuration transfer message, and the network element configuration transfer message is a downlink RAN configuration transfer message.

10. A wireless communication system comprising:
    a target base station;
    a network element;
    a User Equipment (UE) configured to report an Enhanced Cell Global Identifier (ECGI) of a target base station that is missing an X2 or Xn interface Transport Network Layer Association (TNLA); and
    a source base station configured to:
        receive the ECGI of the target base station reported by the UE;
    a network element;
        send a configuration transfer message to the network element as a request for the X2 or Xn interface TNLA of the target base station;
        initiate an initial backoff timer;
        initiate an exponential backoff multiplier;
        determine whether a time elapsed from a previous TNLA discovery procedure timestamp is equal to or greater than a current backoff time wherein the current backoff time is equal to a previous backoff period multiplied by the exponential backoff multiplier, and wherein a TNLA discovery procedure time is a time between sending the configuration transfer message and receiving a network configuration transfer message from the network element;
        resend the configuration transfer message to the network element in a case where the time elapsed from a previous TNLA discovery procedure time is equal to or greater than the current backoff time, and not resend the configuration transfer message to the network element in the case where the time elapsed from the previous TNLA discovery procedure time is less than the current backoff time;

perform an X2 or Xn setup with the target base station in the case where the network element configuration transfer message is received; and stop resending the configuration transfer message once a maximum backoff time is reached and the network element configuration transfer message is not received.

11. The wireless communication system of claim 10, wherein the network element sends the network configuration transfer message after the network element discovers identification information for the target base station.

12. The wireless communication system according to claim 10, wherein the exponential backoff multiplier starts with an initially configured backoff period and subsequently increases the backoff period by a factor multiplied with a previous backoff period, and wherein the exponential backoff multiplier is configured with a maximum backoff time.

13. The wireless communication system according to claim 12, the initial backoff timer, the exponential backoff multiplier and the maximum backoff time are configurable.

14. The wireless communication system according to claim 10, wherein the source base station is further configured to:

determine whether the ECGI is from the same Public Land Mobile Network (PLMN) or a blocked PLMN, and initiate a configuration transfer procedure only for an ECGI that is from the same PLMN or a nonblocked PLMN.

15. The wireless communication system according to claim 14, wherein the source base station is a S-eNB, the target base station is a T-eNB, the network element is a Mobility Management Entity (MME), and the X2 interface is implemented.

16. The wireless communication system according to claim 15, wherein the configuration transfer message is an eNB configuration transfer message, and the network element configuration transfer message is a MME configuration transfer message.

17. The wireless communication system according to claim 14, wherein the source base station is a S-gNB, the target base station is a T-gNB, the network element is an Access and Mobility Management Function (AMF), and the Xn interface is implemented.

18. The wireless communication system according to claim 17, wherein the configuration transfer message is an uplink Radio Access Network (RAN) configuration transfer message, and the network element configuration transfer message is a downlink RAN configuration transfer message.

19. A non-transitory computer-readable storage medium having instructions stored therein that when executed by processing circuitry, cause the processing circuitry to execute a process, the process comprising:

reporting by a User Equipment (UE) an Enhanced Cell Global Identifier (ECGI) of a target neighbor base station that is missing an X2 or Xn interface TNLA in a source base station;

receiving the ECGI of the target neighbor base station missing the X2 or Xn interface TNLA by a source base station;

sending, by the source base station to a network element, a configuration transfer message to get the X2 or Xn interface TNLA of the target neighbor base station wherein a time between sending the configuration transfer message and waiting for the network element to send a network configuration transfer message in response to configuration transfer message comprises a TNLA discovery procedure time;

initiate an initial backoff timer;

initiating an exponential backoff multiplier;

determining whether a time elapsed from a previous TNLA discovery procedure timestamp is equal to or greater than a current backoff time, the current backoff time being equal to a previous backoff period multiplied by the exponential backoff multiplier;

resending by the source base station the configuration transfer message to the network element in a case where the time elapsed from a previous TNLA discovery procedure time is equal to or greater than the current backoff time, and not resending the configuration transfer message to the network element in the case where the time elapsed from the previous TNLA discovery procedure time is less than the current backoff time;

performing an X2 or Xn setup between the source base station and the target base station in the case where the network element configuration transfer message is received; and stopping the source base station from resending the configuration transfer message once a maximum backoff time is reached and the network element configuration transfer message is not received.

* * * * *